United States Patent
Modlin et al.

(10) Patent No.: US 6,480,475 B1
(45) Date of Patent: Nov. 12, 2002

(54) METHOD AND SYSTEM FOR ACCOMODATING A WIDE RANGE OF USER DATA RATES IN A MULTICARRIER DATA TRANSMISSION SYSTEM

(75) Inventors: Cory S. Modlin, Palo Alto, CA (US); Eugene Yuk-Yin Tang, San Jose, CA (US); Po Tong, Los Altos, CA (US); Jacky S. Chow, Gilroy, CA (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/152,917

(22) Filed: Sep. 14, 1998

Related U.S. Application Data

(60) Provisional application No. 60/077,073, filed on Mar. 6, 1998.

(51) Int. Cl.[7] .............................. H04L 5/14; H04L 7/00; H03M 13/27
(52) U.S. Cl. ..................... 370/294; 370/470; 370/479; 370/506; 370/516; 375/260; 375/362; 375/371; 714/701; 714/752; 714/774; 714/776
(58) Field of Search ................................ 370/294, 441, 370/468, 470, 476, 479, 503, 505, 506, 514, 515, 516; 375/225, 226, 260, 261, 262, 362, 363, 371; 714/701, 746, 752, 758, 774, 775, 776, 779

(56) References Cited

U.S. PATENT DOCUMENTS

| | | | |
|---|---|---|---|
| 5,400,322 A | 3/1995 | Hunt et al. | 370/468 |
| 5,459,782 A | * 10/1995 | Volejnik | 375/372 |
| 5,475,716 A | * 12/1995 | Huang | 375/354 |
| 5,479,447 A | 12/1995 | Chow et al. | 375/260 |
| 5,596,604 A | 1/1997 | Cioffi et al. | 375/260 |
| 5,623,513 A | 4/1997 | Chow et al. | 375/219 |
| 5,627,863 A | 5/1997 | Aslanis et al. | 375/357 |
| 5,710,784 A | * 1/1998 | Kindred et al. | 371/43 |
| 5,751,741 A | * 5/1998 | Voith et al. | 371/37.7 |
| 6,128,349 A | * 10/2000 | Chow | 375/260 |

FOREIGN PATENT DOCUMENTS

JP  10303872 A  11/1998

OTHER PUBLICATIONS

Chow et al., "A Practical Discrete Multitone Transceiver Loading Algorithm for Data Transmission over Spectrally Shaped Channels", IEEE Transactions on Communications, vol. 43, No. 2/3/4, Feb./Mar./Apr. 1995.

Fischer and Huber, "A New Loading Algorithm for Discrete Multitone Transmission", 1996 IEEE, pp. 724–728.

John M. Cioffi "A Multicarrier Primer" T1E1.4/91–157 submission, Nov. 11, 1991.

Peeters and Spruyt "A Dynamic Interleaving Scheme for VDSL" T1E1.4/97–052 submission, Feb. 3–7, 1997 Austin, Texas.

American National Standard for Telecommunications– Network and Customer Installation Interfaces– Asymmetric Digital Subscriber Line (ADSL) Metallic Interface. ANSI T1.413–1995.

* cited by examiner

*Primary Examiner*—Alpus H. Hsu
(74) *Attorney, Agent, or Firm*—Pedro P. Hernandez; W. James Brady, III; Frederick J. Telecky, Jr.

(57) ABSTRACT

Improved approaches to provide flexibility in setting user data rates and managing delay in data transmission systems using a superframe structure and Time Division Duplexing (TDD) are disclosed. These improved approaches operate to provide intelligent insertion of dummy words (bits or bites) into a data stream to be transmitted. By inserting the dummy words, the invention is able to render codewords, symbols and superframes independent from user data rates. As a result, a wide range of user data rates are available in data transmission systems using a superframe and TDD.

36 Claims, 8 Drawing Sheets

METHOD AND SYSTEM FOR ACCOMODATING A WIDE RANGE OF USER DATA RATES IN A MULTICARRIER DATA TRANSMISSION SYSTEM

CROSS-REFERENCE TO RELATED APPLICATIONS

This application claims the benefit of U.S. Provisional Application No. 60/077,073, entitled "METHOD AND SYSTEM FOR ACCOMMODATING A WIDE RANGE OF USER DATA RATES IN A MULTICARRIER DATA TRANSMISSION SYSTEM", and filed on Mar. 6, 1998, the disclosure of which is incorporated herein by reference for all purposes.

BACKGROUND OF THE INVENTION

1. Field of the Invention

The present invention relates to data transmission systems, and more particularly, to data transmission systems utilizing time-division duplexing.

2. Description of the Related Art

Bi-directional digital data transmission systems are presently being developed for high-speed data communications. One standard for high-speed data communications over twisted-pair phone lines that has developed is known as Asymmetric Digital Subscriber Lines (ADSL). Another standard for high-speed data communications over twisted-pair phone lines that is presently proposed is known as Very High Speed Digital Subscriber Lines (VDSL). In general, these high-speed data communications techniques are referred to as xDSL systems.

The Alliance For Telecommunications Information Solutions (ATIS), which is a group accredited by the ANSI (American National Standard Institute) Standard Group, has finalized a discrete multi tone based approach for the transmission of digital data over twisted-pair phone lines. The standard, known as ADSL, is intended primarily for transmitting video data and fast Internet access over ordinary telephone lines, although it may be used in a variety of other applications as well. The North American Standard is referred to as the ANSI T1.413 ADSL Standard (hereinafter ADSL standard), and is hereby incorporated by reference. Transmission rates under the ADSL standard are intended to facilitate the transmission of information at rates of up to 8 million bits per second (Mbits/s) over twisted-pair phone lines. The standardized system defines the use of a discrete multi tone (DMT) system that uses 256 "tones" or "sub-channels" that are each 4.3125 kHz wide in the forward (downstream) direction. In the context of a phone system, the downstream direction is defined as transmissions from the central office (typically owned by the telephone company) to a remote location that may be an end-user (i.e., a residence or business user). In other systems, the number of tones used may be widely varied.

The ADSL standard also defines the use of reverse transmissions at a data rate in the range of 16 to 800 Kbit/s. The reverse transmissions follow an upstream direction, as for example, from the remote location to the central office. Thus, the term ADSL comes from the fact that the data transmission rate is substantially higher in the downstream direction than in the upstream direction. This is particularly useful in systems that are intended to transmit video programming or video conferencing information to a remote location over telephone lines.

Because both downstream and upstream signals travel on the same pair of wires (that is, they are duplexed) they must be separated from each other in some way. The method of duplexing used in the ADSL standard is Frequency Division Duplexing (FDD) or echo canceling. In frequency division duplexed systems, the upstream and downstream signals occupy different frequency bands and are separated at the transmitters and receivers by filters. In echo cancel systems, the upstream and downstream signals occupy the same frequency bands and are separated by signal processing.

ANSI is producing another standard for subscriber line based transmission system, which is referred to as the VDSL standard. The VDSL standard is intended to facilitate transmission rates of at least about 4 Mbit/s and up to about 52 Mbit/s or greater in the downstream direction. Simultaneously, the Digital, Audio and Video Council (DAVIC) is working on a similar system, which is referred to as Fiber To The Curb (FTTC). The transmission medium from the "curb" to the customer is standard unshielded twisted-pair (UTP) telephone lines.

A number of modulation schemes have been proposed for use in the VDSL and FTTC standards (hereinafter VDSL/FTTC). For example, some of the possible VDSL/FTTC modulation schemes include multi-carrier transmission schemes such as Discrete Multi-Tone modulation (DMT) or Discrete Wavelet Multi-Tone modulation (DWMT), as well as single carrier transmission schemes such as Quadrature Amplitude Modulation (QAM), Carrierless Amplitude and Phase modulation (CAP), Quadrature Phase Shift Keying (QPSK), or vestigial sideband modulation.

Additionally, multicarrier modulation transmission schemes have been receiving a large amount of attention due to the high data transmission rates they offer. FIG. 1A is a simplified block diagram of a conventional transmitter 100 for a multicarrier modulation system. The conventional transmitter 100 is, for example, suitable for DMT modulation in ADSL or VDSL systems. The transmitter 100 receives data signals to be transmitted at a buffer 102. The data signals are then supplied from the buffer 102 to a forward error correction (FEC) unit 104. The FEC unit 104 compensates for errors that are due to crosstalk noise, impulse noise, channel distortion, etc. The signals output by the FEC unit 104 are supplied to a data symbol encoder 106. The data symbol encoder 106 operates to encode the signals for a plurality of frequency tones associated with the multicarrier modulation. In assigning the data, or bits of the data, to each of the frequency tones, the data symbol encoder 106 utilizes data stored in a transmit bit allocation table 108 and a transmit energy allocation table 110. The transmit bit allocation table 108 includes an integer value for each of the carriers (frequency tones) of the multicarrier modulation. The integer value indicates the number of bits that are to be allocated to the particular frequency tone. The value stored in the transmit energy allocation table 110 is used to effectively provide fractional number of bits of resolution via different allocation of energy levels to the frequency tones of the multicarrier modulation. In any case, after the data symbol encoder 106 has encoded the data onto each of the frequency tones, an Inverse Fast Fourier Transform (IFFT) unit 112 modulates the frequency domain data supplied by the data symbol encoder 106 and produces time domain signals to be transmitted. The time domain signals are then supplied to a digital-to-analog converter (DAC) 114 where the digital signals are converted to analog signals. Thereafter, the analog signals are transmitted over a channel to one or more remote receivers.

FIG. 1B is a simplified block diagram of a conventional remote receiver 150 for a multicarrier modulation system. The conventional remote receiver 150 is, for example, suitable for DMT demodulation in ADSL or VDSL systems. The remote receiver 150 receives analog signals that have been transmitted over a channel by a transmitter. The received analog signals are supplied to an analog-to-digital converter (ADC) 152. The ADC 152 converts the received analog signals to digital signals. The digital signals are then supplied to a Fast Fourier Transform (FFT) unit 154 that demodulates the digital signals while converting the digital signals from a time domain to a frequency domain. The demodulated digital signals are then supplied to a frequency domain equalizer (FEQ) unit 156. The FEQ unit 156 performs an equalization on the digital signals so the attenuation and phase are equalized over the various frequency tones. Then, a data symbol decoder 158 receives the equalized digital signals. The data symbol decoder 158 operates to decode the equalized digital signals to recover the data, or bits of data, transmitted on each of the carriers (frequency tones). In decoding the equalized digital signals, the data symbol decoder 158 needs access to the bit allocation information and the energy allocation information that were used to transmit the data. Hence, the data symbol decoder 158 is coupled to a received bit allocation table 162 and a received energy allocation table 160 which respectively store the bit allocation information and the energy allocation information that were used to transmit the data. The data obtained from each of the frequency tones is then forwarded to the forward error correction (FEC) unit 164. The FEC unit 164 performs error correction of the data to produce corrected data. The corrected data is then stored in a buffer 166. Thereafter, the data may be retrieved from the buffer 166 and further processed by the receiver 150. Alternatively, the received energy allocation table 160 could be supplied to and utilized by the FEQ unit 166.

The bit allocation tables and the energy allocation tables utilized in the conventional transmitter 100 can be implemented as a single table or as individual tables. Likewise, the bit allocation tables and the energy allocation tables utilized in the remote receiver 150 can be implemented as a single table or as individual tables. Also, the transmitter 100 is normally controlled by a controller, and the remote receiver 150 is normally controlled by a controller. Typically, the controllers are programmable controllers.

The transmitter 100 and the remote receiver 150 illustrated in FIGS. 1A and 1B, respectively, optionally include other components. For example, the transmitter 100 could add a cyclic prefix to symbols after the IFFT unit 112, and the remote receiver 150 can then remove the cyclic prefix before the FFT unit 154. Also, the remote receiver 150 can provide a time domain equalizer (TEQ) unit between the ADC 152 and the FFT unit 154. The transmitter 100 could also each respectively include a scrambler, a cyclic redundancy check (CRC) and an interleaver, with the remote receiver 150 including counterpart devices.

Most of the proposed VDSL/FTTC transmission schemes utilize frequency division duplexing (FDD) of the upstream and downstream signals. On the other hand, one particular proposed VDSL/FTTC transmission scheme uses time division duplexing (TDD) of the upstream and downstream signals. More particularly, the time division duplexing is synchronized in this case such that periodic synchronized upstream and downstream communication periods do not overlap with one another. That is, the upstream and downstream communication periods for all of the wires that share a binder are synchronized. With this arrangement, all the very high speed transmissions within the same binder are synchronized and time division duplexed such that downstream communications are not transmitted at times that overlap with the transmission of upstream communications. This is also referred to as a (i.e. "ping pong") based data transmission scheme. Quiet periods, during which no data is transmitted in either direction, separate the upstream and downstream communication periods. When the synchronized time division duplexed approach is used with DMT it is often referred to as synchronized DMT (SDMT).

A common feature of the above-mentioned transmission systems is that twisted-pair phone lines are used as at least a part of the transmission medium that connects a central office (e.g., telephone company) to users (e.g., residence or business). Even though fiber optics may be available from a central office to the curb near a user's residence, twisted-pair phone lines are used to bring in the signals from the curb into the user's home or business.

The twisted-pair phone lines are grouped in a binder. While the twisted-pair phone lines are within the binder, the binder provides reasonably good protection against external electromagnetic interference. However, within the binder, the twisted-pair phone lines induce electromagnetic interference on each other. This type of electromagnetic interference is generally known as crosstalk interference which includes near-end crosstalk (NEXT) interference and far-end crosstalk (FEXT) interference. As the frequency of transmission increases, the crosstalk interference (NEXT interference) becomes substantial. As a result, the data signals being transmitted over the twisted-pair phone lines at high speeds can be significantly degraded by the crosstalk interference caused by other twisted-pair phone lines in the binder. As the speed of the data transmission increases, the problem worsens. One advantage of the synchronized TDD (such as SDMT) based data transmission is that crosstalk interference (NEXT interference) from other lines in a binder is essentially eliminated, provided all the lines transmit for the same duration (i.e., same superframe format).

A data transmission system often includes a central office and a plurality of remote units. Each remote unit communicates with the central office over a data link (i.e., channel) that is established between the central office and the particular remote unit. To establish such a data link, initialization processing is performed to initialize communications between the central office and each of the remote units. For purposes of the discussion to follow, a central office includes a central modem (or central unit) and a remote unit includes a remote modem. These modems are transceivers that facilitate data transmission between the central office and the remote unit. The central office thus often includes a plurality of central side transceivers, each of which has a central side transmitter and a central side receiver, and the remote unit normally includes a remote side transceiver having a remote side transmitter and a remote side receiver.

When a data transmission system is operating in a time division duplexed (TDD) manner, the transmitters and receivers of the central office and remote units must be synchronized in time so that transmission and reception do not overlap in time. In a data transmission system, downstream transmissions are from a central side transmitter to one or more remote side receivers and upstream transmissions are from one or more remote side transmitters to a central side receiver. The central side transmitter and receiver can be combined as a central side transceiver, and the remote side transmitter and receiver can be combined as a remote side transceiver.

Generally speaking, in a time division duplexed system, upstream signals are alternated with downstream signals. Typically, the upstream transmissions and the downstream transmissions are separated by a guard interval or a quiet period. The guard interval is provided to enable the transmission system to reverse the direction in which data is being transmitted so that a transmission can be received before the transmission in the opposite direction occurs. Some transmission schemes divide upstream and downstream transmissions into smaller units referred to as frames. These frames may also be grouped into superframes that include a series of downstream frames and a series of upstream frames, as well as guard intervals between the two.

Time division duplexing is a simple method to share a channel (medium) between two or more transceivers. Each transceiver is assigned a time slot during which it may transmit, and there are quiet periods (guard intervals) during which no unit must transmit. On channels subject to crosstalk (NEXT interference) between multiple connections, if time division duplexing is used, synchronization must be established and maintained among all units so affected. An example is the VDSL service that uses the existing twisted pair telephone loop plant to transport up to 13–52 Mb/s on loops up to 1.5 km. Pairs destined for subscribers are bundled together in a cable consisting of 25–100 pairs. The proximity and the high frequency use (0.2–11 MHz signal bandwidth) leads to significant crosstalk between adjacent pairs in a binder. To get the desired data rate on loops up to several km long, DMT is a suitable multicarrier modulation scheme. This scheme makes excellent use of time-division duplexing since a single FFT unit can be used during transmission and reception and avoids the need for two such FFT units, and other savings in the analog circuitry.

FIG. 2A is a diagram of a superframe 200 suitable for use in VDSL data transmission systems. SDMT is a multicarrier data transmission scheme in which each of a plurality of frames included in the superframe 200 utilize a plurality of frequency tones to carry bits of data between a transmitter and receiver. More particularly, the superframe 200 includes twenty (20) frames. Frames 1–9 are used to transmit data in a downstream direction, frames 11–19 are used to transmit data in an upstream direction, and frames 10 and 20 are quiet periods. During the quiet periods data is not transmitted in either direction. Accordingly, as seen by the superframe 200, the VDSL data transmission systems have alternating periods of transmission and reception which operate to provide time division duplexing (TDD) transmission.

Although FIG. 2A illustrated a superframe as having twenty (20) frames, it should be recognized that a wide variety of superframe sizes and formats are available. By altering the number of the frames (or symbols) assigned to upstream and downstream directions, different formats for a superframe can be obtained and these different formats result in different levels of service being provided to the transmitter and receiver.

Additional details on data communications can be found, for example, in U.S. Pat. Nos. 5,479,447; 5,596,604; 5,623,513; and 5,627,863, which are hereby incorporated by reference. Additional details on ADSL can be found in American Nationals Standard Institution (ANSI) published standard ANSI T1.413-1995 pertaining to Network and Customer Installation Interfaces—Asymmetric Digital Subscriber Lines (ADSL) Metallic Interface, which is hereby incorporated by reference.

One problem with TDD systems such as SDMT is that the number of frames per superframe that transmit in any given direction is variable, and thus such systems do not have any constant average symbol rate. As a consequence, setting the user data rate tends to be more complicated and has more irregular granularity than conventionally provided in existing lower speed communication methods such as SDMT data communication systems. In ADSL and previously proposed VDSL data communication systems, there is a constant symbol rate which in turn translates to the fact that a user can choose any data rate in multiples of 32 k bits/seconds (kbps). Accordingly, there is a need for improvements with VDSL data communication systems so that the user data rate is granular (i.e., as granular as ADSL) but does not depend on internal system issues like the size of the superframe or the number of downstream frames in a superframe.

Another problem associated with TDD and SDMT data communication systems is that undesirable delays can occur if codewords (resulting from error correction processing) for a particular superframe end up crossing a superframe boundary during transmission. In such a case, there is an undesired time delay associated with the reception of a particular codeword that crosses a superframe boundary because of the predetermined time gap until the next transmission period due to the alternating transmissions and receptions of data in a TDD system. Such a problem is not present in ADSL since ADSL relies on frequency division duplexing (FDD) or echo canceling to provide the separation between upstream and downstream transmissions (as opposed to time division duplexing (TDD)).

Yet another problem associated with VDSL data communication systems is that the coding gain of error correction (i.e., FEC) is strongly dependent on the size of the codewords. Generally speaking, the larger the codeword size (N), the greater the coding gain. For example, a Reed Solomon code with N=255 and K=239 out performs a similar code with N=155 and K=139 (with N−K=16 in both cases) by 3 dB under typical conditions. In ADSL the frames or symbols are fixed with respect to a codeword at 1, 2, 4, 8 or 16 symbols per codeword. However, if in VDSL the codeword size or number of symbols per symbol were fixed, the coding gain would ends up being dependent on the superframe rate, symbols per superframe or other internal system issues which is not desirable.

Thus, there is a need for improved approaches to provide flexibility in setting user data rates and managing delay in data transmission systems using a superframe structure and Time Division Duplexing (TDD).

SUMMARY OF THE INVENTION

Broadly speaking, the invention relates to improved approaches to provide flexibility in setting user data rates and managing delay in data transmission systems using a superframe structure and Time Division Duplexing (TDD). These improved approaches operate to provide intelligent insertion of dummy words (bits or bytes) into a data stream to be transmitted. By inserting the dummy words, the invention is able to render codewords, symbols and superframes independent from user data rates. As a result, a wide range of user data rates are available in data transmission systems using a superframe and TDD.

The invention can be implemented in numerous ways, including as an apparatus, system, method, or computer readable media. Several embodiments of the invention are discussed below.

As a method for transmitting a data quantity in a superfame of a multicarrier modulation system, one embodiment of the invention includes the operations of: identifying a user rate for data transmissions; identifying a superframe rate;

determining a data quantity to be transmitted in a given superframe based on the user rate and the superframe rate; determining a code rate for providing redundancy with the data quantity; and determining a first adjustment dummy data quantity such that when added to the data quantity and then multiplied by the code rate yields an integer number.

As a method for transmitting a data quantity in a superframe of a multicarrier modulation system, where the superframe including transmit frames and receive frames, another embodiment of the invention includes the operations of: identifying a user rate for data transmissions; identifying a superframe rate; determining a data quantity to be transmitted in the superframe based on the user rate and the superframe rate; determining a code rate (e.g., via codeword size and dataword size) for providing redundancy with the data quantity; determining a first adjustment dummy data quantity such that when added to the data quantity and then multiplied by the code rate yields an integer number representing an enlarged data quantity to be transmitted in the superframe; and determining a second adjustment dummy data quantity such that when added to the enlarged data quantity to produce a final data quantity, the final data quantity is evenly divisible by the number of transmit frames in the superframe.

As a computer readable medium containing program instructions for transmitting a data quantity in a superfame of a multicarrier modulation system, the superframe including transmit frames and receive frames, one embodiment of the invention includes: first computer readable code devices for identifying a user rate for data transmissions; second computer readable code devices for identifying a superframe rate; third computer readable code devices for determining a data quantity to be transmitted in the superframe based on the user rate and the superframe rate; fourth computer readable code devices for determining a code rate for providing redundancy with the data quantity; and fifth computer readable code devices for determining a first adjustment dummy data quantity such that when added to the data quantity and then multiplied by the code rate yields an integer number representing an enlarged data quantity to be transmitted in the superframe. Optionally, the computer readable medium can also include sixth computer readable code devices for determining a second adjustment dummy data quantity such that when added to the enlarged data quantity to produce a final data quantity, the final data quantity is evenly divisible by the number of transmit frames in the superframe.

As a transmitter apparatus for a data transmission system using multicarrier modulation, an embodiment of the invention includes: a buffer that receives and stores a data quantity to be transmitted; a first insertion unit that determines a first quantity of dummy data and inserts the first quantity of dummy data into the data quantity supplied from the buffer to produce an enlarged data quantity; an error correction unit that receives the enlarged data quantity and performs redundancy coding to produce a redundancy data quantity; a data symbol encoder that receives the redundancy data quantity to be transmitted and encodes bits associated with the redundancy data quantity to frequency tones of a frame; a multicarrier modulation unit that modulates the encoded bits on the frequency tones of a frame to produce modulated signals; and a digital-to-analog converter that converts the modulated signals to analog signals. Optionally, the transmitter apparatus can further include a second insertion unit that determines a second quantity of dummy data and inserts the second quantity of dummy data into the redundancy data quantity supplied from the error correction unit to produce a modified redundancy data quantity.

The advantages of the invention are numerous. One advantage of the invention is that error correction (e.g., FEC) codewords are decoupled from frames (or symbols) as well as superframes. The result is that user data rate is made more independent from system performance and thus can be readily set in accordance with industry standards. Another advantage of the invention is that only minimal overhead is needed and that high coding gains can be maintained.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The invention relates to improved approaches to provide flexibility in setting user data rates and managing delay in data transmission systems using a superframe structure and Time Division Duplexing (TDD). These improved approaches operate to provide intelligent insertion of dummy words (bits or bytes) into a data stream to be transmitted. By inserting the dummy words, the invention is able to render codewords, symbols and superframes independent from user data rates. As a result, a wide range of user data rates are available in data transmission systems using a superframe and TDD.

In a conventional ADSL and previously proposed VDSL data transmission systems, the codewords produced by an FEC coding unit are tied to the frames (or symbols), with each codeword spanning one or more frames. In the case where the data transmission system is a VDSL system, the invention prevents the codeword size from being dependent on (or tied to) the frame or symbol size because doing so causes the system performance to undesirably depend on the superframe rate, symbols per superframe, or other internal system issues.

Embodiments of the invention are discussed below with reference to FIGS. 2B–6. However, those skilled in the art will readily appreciate that the detailed description given herein with respect to these figures is for explanatory purposes as the invention extends beyond these limited embodiments.

In SDMT it has been proposed to have a superframe structure including a fixed number (e.g., 20) frames, with each frame being associated with a DMT symbol. With such a frame format, the number of frames being used for downstream transmissions and the number of frames being used for upstream transmissions can vary. As a result, there are several different superframe formats that can occur. Typically, a superframe consists of a downstream burst of several frames and an upstream burst of several frames. Quiet frames are inserted between the upstream and the downstream bursts to allow the channel to settle before the direction of transmission is changed.

Depending on the level of service being provided, data transmission implemented with SDMT can be symmetric or asymmetric with respect to upstream and downstream transmissions. With symmetric transmission, DMT symbols tend to be transmitted in alternating directions for equal durations. In other words, the duration in which DMT symbols are transmitted downstream is the same as the duration in which DMT symbols are transmitted upstream. With asymmetric transmission, DMT symbols tend to be transmitted downstream for a longer duration than upstream (or vice versa).

Figure 1A:
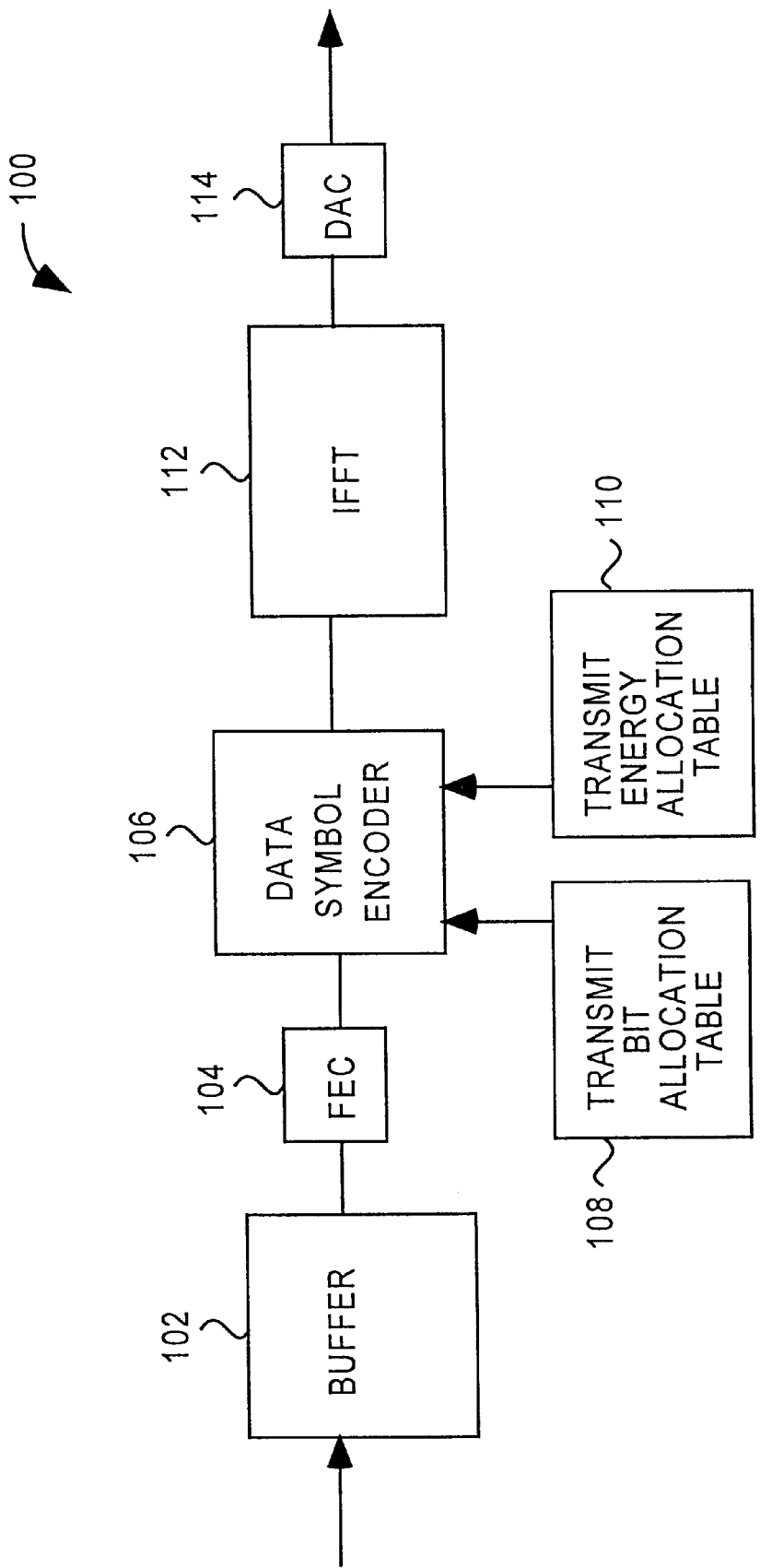
FIG. 1A is a simplified block diagram of a conventional transmitter for a multicarrier modulation system.
Figure 1B:
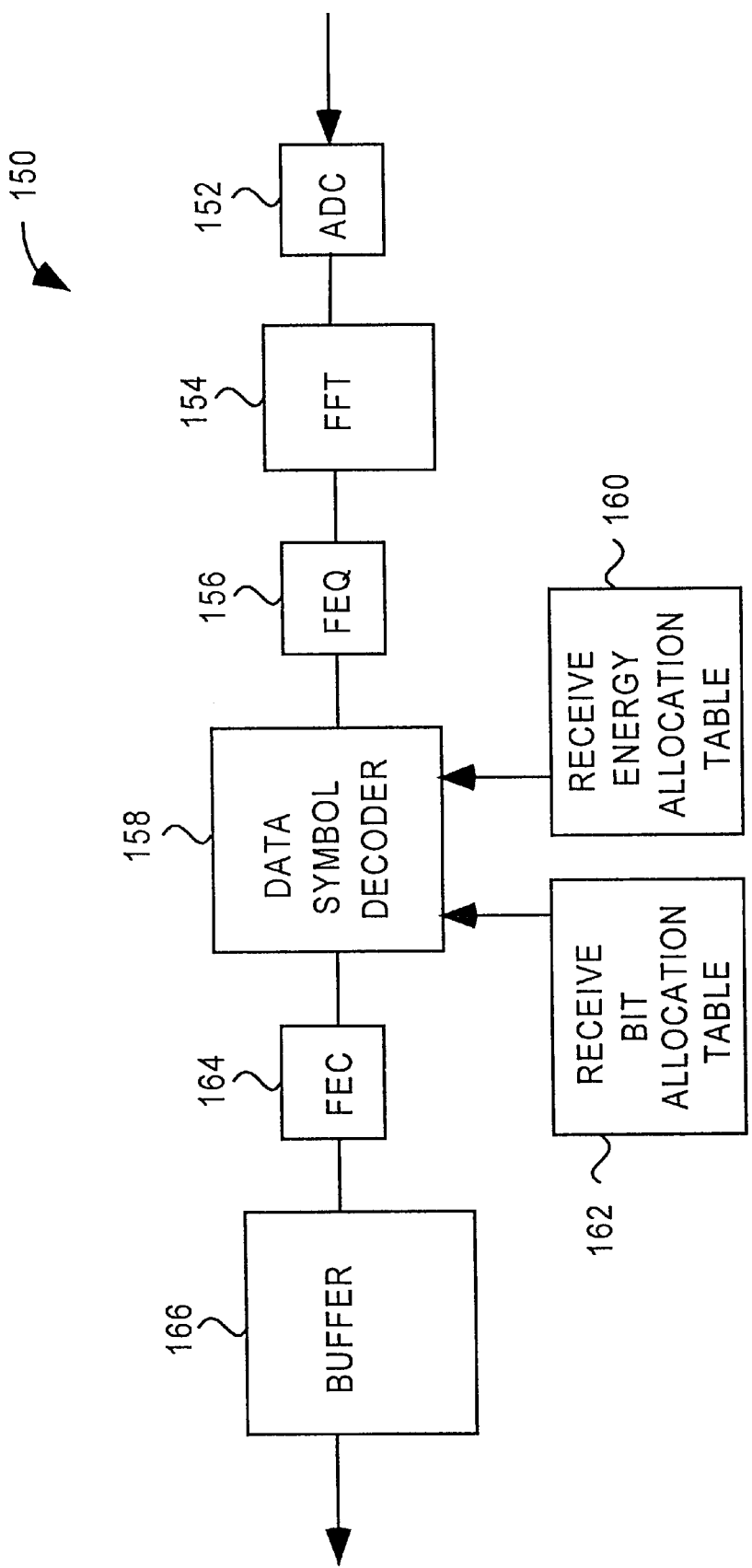
FIG. 1B is a simplified block diagram of a conventional remote receiver for a multicarrier modulation system.
Figure 2A:
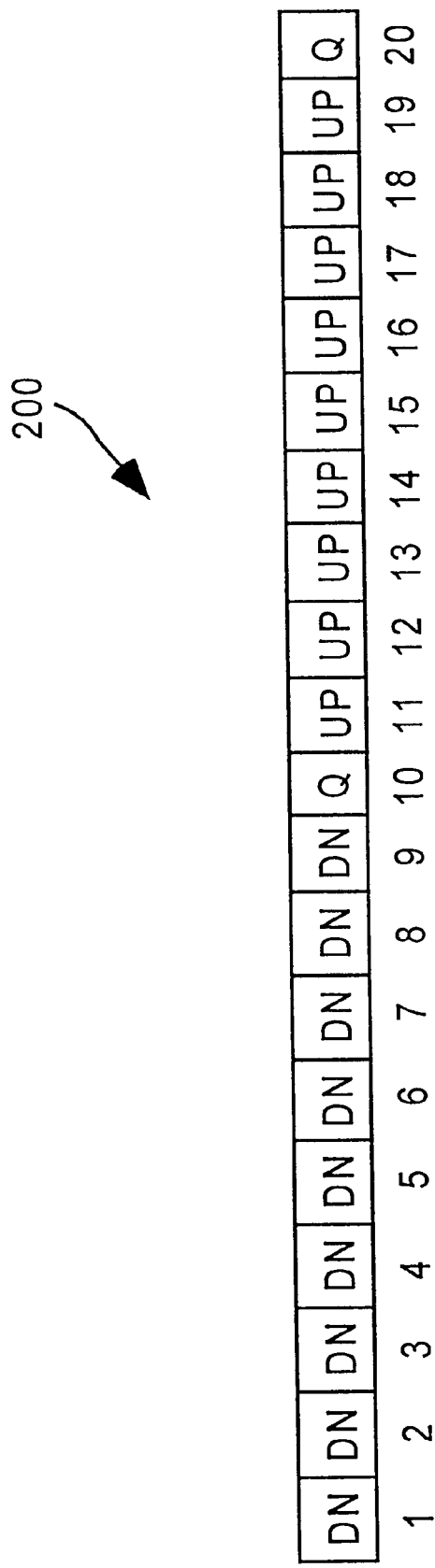
FIG. 2A is a diagram of a superframe suitable for use in VDSL data transmission systems.
Figure 2B:
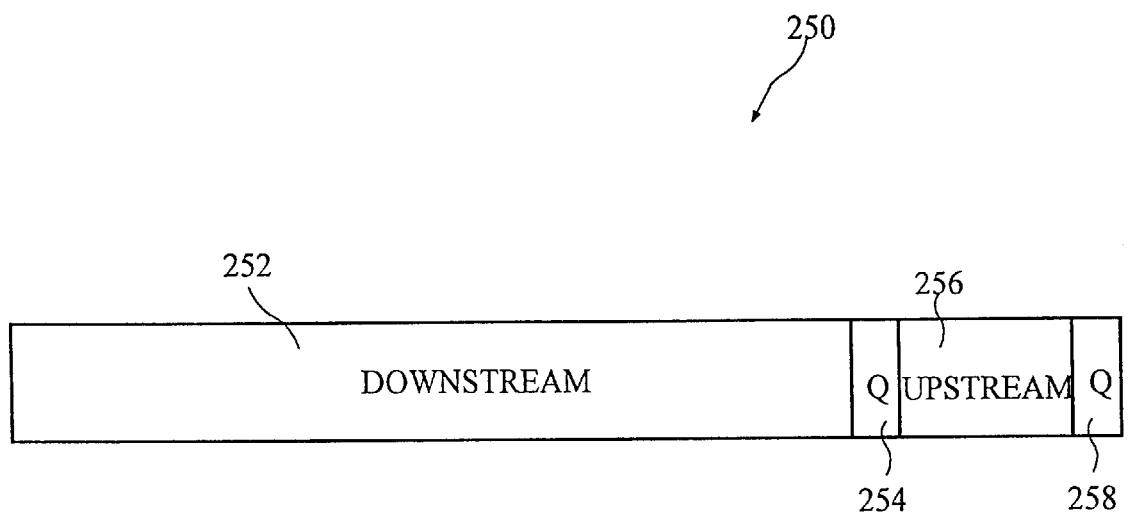
FIG. 2B is a diagram illustrating an exemplary superframe format in which a certain level of service is provided.

FIG. 2B is a diagram illustrating an exemplary superframe format 250 in which a certain level of service is provided. The superframe format 250 is an asymmetric frame that includes a downstream portion 252, a quiet portion 254, an upstream portion 256, and a quiet portion 258. The quiet portions (quiet periods) 254 and 258 are positioned between the downstream and upstream transmissions. With this asymmetric superframe format 250, the downstream portion 252 is substantially larger (e.g., longer burst) than the upstream portion 256. Such a superframe format is useful for situations in which downstream traffic is significantly greater than the upstream traffic. As an example, with respect to FIG. 2B, the superframe format 250 can include 16 symbols downstream; 1 quiet period; 2 symbols upstream; and 1 quiet period.

According to the invention, dummy words (bits or bytes) are inserted into a data stream that is to be transmitted. The insertion of dummy words into the data stream renders the user data rates independent of the codeword size, the number of symbols, and the superframe size. A wide range of user data rates are thus available in data transmission systems using a superframe and TDD.

In one embodiment, dummy words are inserted in two separate places to provide the advantages of invention. The first insertion of dummy words into the user data stream operates to ensure that after FEC encoding, there is still a integer number of coded bits in each coded frame. Although these dummy words are part of the FEC codewords that end up being transmitted over a channel to a receiver, the receiver operates to discard these dummy words after it performs FEC decoding. Since the number of dummy words inserted in this first place is low, a high coding gain is still maintained.

The second insertion of dummy words into the user data stream occurs after FEC encoding. Here, the insertion of dummy words is provided to ensure that every symbol (e.g., DMT symbol) carries the same number of bits and that therefore the number of bits actually transmitted over the channel must be a multiple of the number of the symbols.

Again, these dummy words are transmitted over the channel but in this case are not part of the FEC codeword. Also, at the receiver, these dummy words, are also discarded. Further, the overhead associated with the transmission of these dummy words is also negligible. It should however, be noted that if the data transmission system provides a mechanism to vary the number of bits carried by each of the symbols, then the insertion of the second insertion of dummy words may not be necessary.

Figure 3:
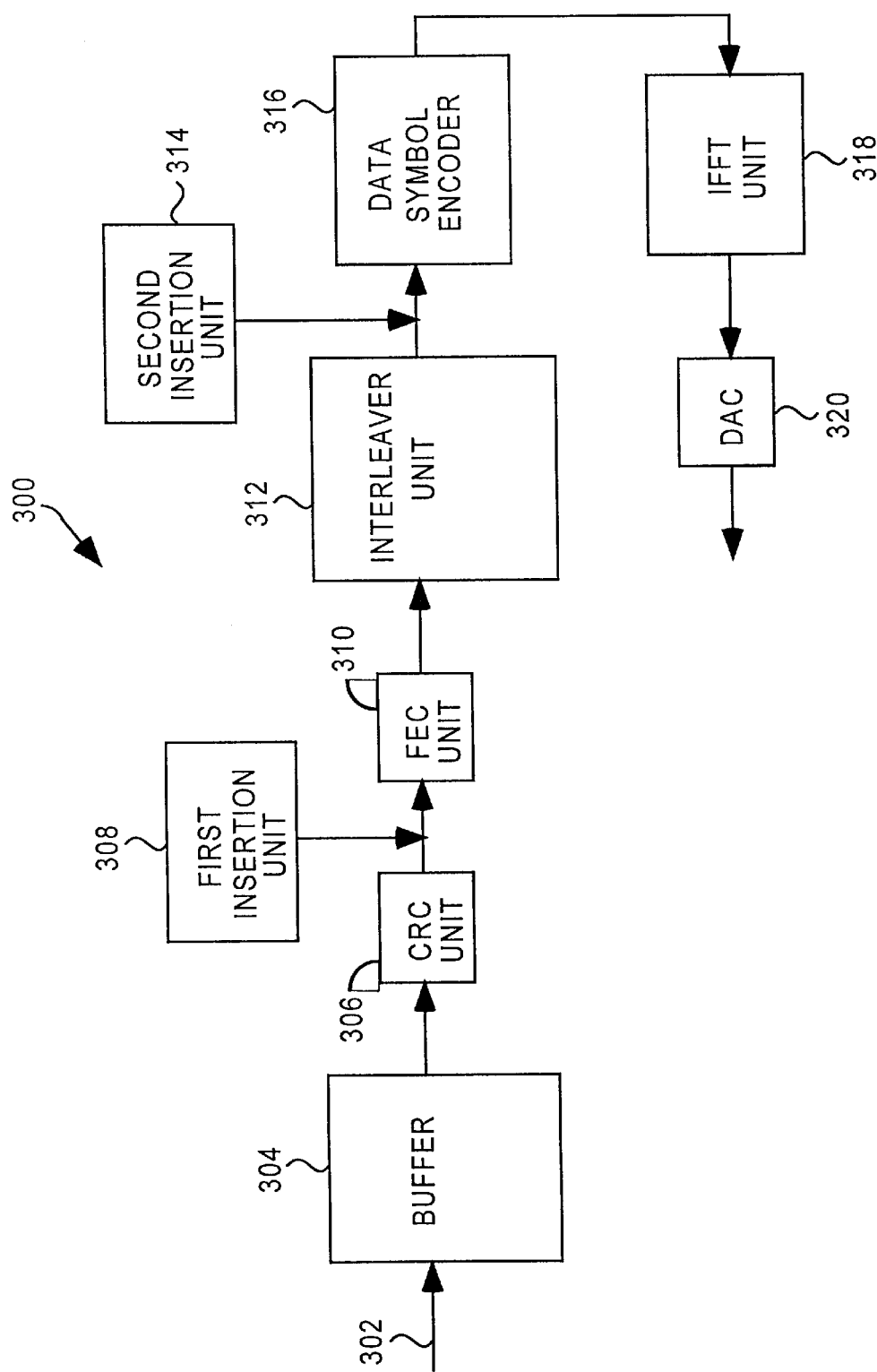
FIG. 3 is a block diagram of a data communication system according to an embodiment of the invention.

FIG. 3 is a block diagram of a data communication system 300 according to an embodiment of the invention. The data communication system 300 receives a user data stream 302 that contains data to be transmitted. The data stream 302 is supplied to a buffer 304 which buffers the data stream 302 as it is being supplied to the data communication system 300. Data is retrieved from the buffer 304 and supplied to a Cyclic Redundancy Check (CRC) unit 306. The CRC unit 306 operates to add additional bits (referred to as CRC bits) to the data stream. The additional bits added by the CRC unit 306 can include any additional information to be sent over the channel, for simplicity we refer to this information as CRC bits. It should also be noted that the CRC unit 306 is optional and need not be used in the data communication system 300. The modified data stream is then further enlarged by a first insertion unit 308. The first insertion unit 308 operates to insert one or more stage-1 dummy words into the modified data stream. The effect of the stage-1 dummy words is to beneficially render the codeword size subsequently produced such that there are an integer number of coded words per superframe. The resulting enlarged data stream is then supplied to a Forward Error Correction (FEC) unit 310. The FEC unit 310 performs error correction coding of the resulting enlarged data stream to produce a series of codewords. Due to the insertion of the stage-1 dummy words, the number of codewords to be transmitted during a given superframe can be an integer quantity so that a codeword is not split across two superframes.

The series of codewords from the FEC unit 310 are then optionally supplied to an interleaver unit 312. The interleaver unit 312 rearranges the codewords for better transmission characteristics. Following the interleaver unit 312, a second insertion unit 314 is provided to insert one or more stage-2 dummy words into the codeword stream. The effect of the second insertion unit 314 is to ensure that the amount of data to be transmitted by a superframe is evenly dividable by the number of transmit symbols within that superframe format. Thereafter, a data symbol encoder 316 encodes the codewords for transmission. Next, an IFFT unit 318 performs an Inverse Fast Fourier Transform on the encoded codewords to produce time domain signals. The time domain signals then convert to an analog form by a digital-to-analog converter (DAC) 320. The resulting analog signals are then transmitted over a channel to one or more receivers.

Figure 4:
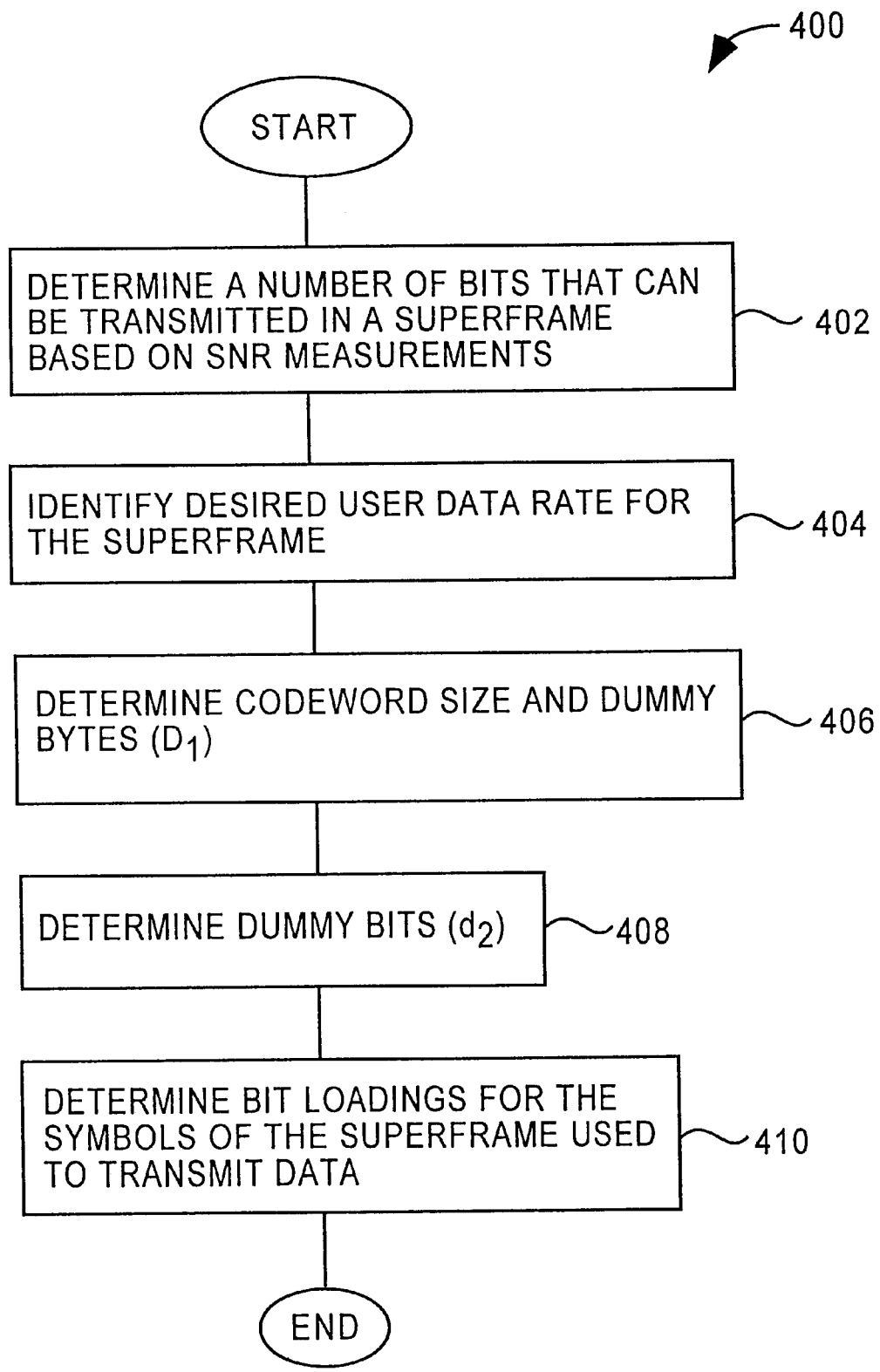
FIG. 4 is a flow diagram of rate adjustment processing according to an embodiment of the invention.

FIG. 4 is a flow diagram of rate adjustment processing 400 according to an embodiment of the invention. The rate adjustment processing 400 is, for example, performed by the data communication system 300 illustrated in FIG. 3.

The rate adjustment processing 400 initially determines 402 a number of bits that can be transmitted in a superframe based on the signal-to-noise (SNR) measurements. The SNR measurements are commonly taken during an initialization period to determine how much data a channel or frame can handle given some predetermined quality or performance threshold. A desired user data rate for the superframe is also identified 404. Here, the desired user data rate is ordinarily selected by a user or system administrator of the data communication system. As an example, the user may provide a number of available data rates to a system and the system might select one of such rates. Alternatively, the user could request any rate that is a multiple of 64 kbps (as an example) which facilitates user designation of rate in accordance with industry standards (e.g., 64, 96, 128, 160 kbps). Such rates are in accordance with current standards in the modem industry in which 64 kbps is a common factor in many conventional rates.

After the user data rate has been identified 404, a codeword size and a number of dummy bytes (D1) can be determined 406. The first number of dummy bytes (D1) are used to complete or fill an integer number of words used to transmit data within a given superframe (e.g., an integer number of codewords within a superframe). In other words, following insertion of the dummy bytes (D1) into the data stream, the enlarged data stream becomes evenly divisible by the codeword size. The codeword size and the number of dummy bytes (D1) can be determined 406 independently or dependently. When determined independently, the codeword size (N) is able to be predetermined for a given code rate (N/K). When determined dependently, the codeword size (N) is allowed to vary to some extent so that the number of dummy bytes (D1) is often lower than would otherwise be determined by an independent determination, yet the varying of the codeword size (N) is controlled so that the coding gain is not significantly hindered. In any case, N−R=K, where R is a codeword redundancy in a codeword and K is unit of data (e.g., bits or bytes) in a codeword (K is also referred to as a dataword). In the case of a VDSL system using SDMT, the codeword size (N) is often in the range of 200 through 255 bytes, where the codeword redundancy (R) is in the range 2–32 bytes (e.g., 16 bytes).

Next, a number of dummy bits (d2) is determined 408. Here, the dummy bits (d2) are inserted into the data stream to ensure that the number of bits transmitted in a given superframe is evenly divisible by the number of transmit symbols for the given superframe. The use of the dummy bits (d2) thus eliminates the problem associated with having symbols that vary in size. On the other hand, when the data transmission system allows symbols (frames) within a superframe to carry differing amounts of data, then the use of the dummy bits (d2) is not needed, provided that there is sufficient flexibility in providing the differing amounts of data for various symbols.

Thereafter, bit loadings for the symbols (frames) of the superframe that are used to transmit data are determined 410. In other words, once the dummy bytes (D1), the dummy bits (d2) and the codeword size are determined, the bit loading that the symbols of the superframe can support are determined. If all symbols are to carry the same amount of data, then only a single bit allocation table would be needed. Alternatively, if some or all of the symbols of the superframe are allowed to carry differing amounts or arrangements of data, then a plurality of bit allocations would be used. Additional details on the use of multiple bit allocation tables is contained in U.S. application Ser. No. 08/855,881, filed May 12, 1997, and entitled "Method and Apparatus for Superframe Bit Allocation," and is hereby incorporated by reference. Following block 410, the rate adjustment processing 400 is complete and ends.

The rate adjustment processing 400 is typically associated with an initialization procedure for a data communication system. It is during initialization in which a user selects or provides a user data rate and during which coding gains and bit loadings are determined. Additionally, to facilitate the advantages of the invention, during initialization, the number of dummy bytes (D1) is determined and optionally the number of dummy bits (d2) is determined.

The operation of the invention is discussed below in further detail. The invention adds the dummy bytes (D1) and the dummy bits (d2) to the data stream so that two conditions are present. The first condition is that the number of coded bytes to be transmitted in a given superframe should be an integer. The first condition is met by the insertion of the dummy bytes (D1) into the data stream. The second condition is that the number of coded bits to be transmitted should be a multiple of the number of transmit symbols in the superframe when all the symbols are to carry the same number of bits. The second condition is met by the insertion of the dummy bits (d2) into the data stream. When the system permits the symbols to carry differing numbers of bits, the second condition is satisfied by the variable bit allocations and thus the dummy bits (d2) can be eliminated.

Additional details on the operation of the data communication system 300 illustrated in FIG. 3 are described below for one embodiment of the invention. In the data communication system 300, the incoming data stream includes a certain amount of bits of data per superframe as determined by a user data rate. Such data is denoted user and represents bits of data per superframe. The data output by the CRC unit 306 is then represented by the following equation.

$$\text{user}+crc \text{ (bits/superframe)}$$

where crc is a cyclic redundancy check added by the CRC unit 306.

The first insertion unit 308 then inserts a number of bits referred to as dummy bits (d1). The data output by the first insertion unit 308 is then represented by the following equation.

$$\text{user}+crc+d1 \text{ (bits/superframe)}$$

Next, the FEC unit 310 performs error correction coding in accordance with a code rate (n/k), where n is the codeword size in bits, k is the dataword size in bits, and n−k=r which is a redundancy quantity in bits. The integers n and k are, for example, the Reed Solomon codeword lengths, in bits, after and before encoding respectively (typically, Reed Solomon codes are implemented in terms of bytes so that n and k are multiples of eight). The resulting data output then from the FEC unit 310 is then represented by the following equation (1).

$$(\text{user}+crc+d1) \times (n/k) \text{ (bits/superframe)} \rightarrow \text{Integer} \quad (1)$$

Thereafter, following the interleaver unit 312, the second insertion unit 314 inserts a number of bits referred to as dummy bits (d2). The data output by the second insertion unit 314 is then represented by the following equation.

$$[(\text{user}+crc+d1) \times (n/k)]+d2 \text{ (bits/superframe)}$$

Accordingly, one approach to satisfy the first condition is to ensure that the superframe is evenly divisible by an integer number of codewords. This can be achieved by determining the number of dummy bits (d1) and the dataword size (k) in the following Equation (2) such that the Equation (2) yields an integer.

$$(\text{user}+crc+d1) \times (1/k) \rightarrow \text{Integer} \quad (2)$$

This approach is then to determine the number of dummy bits (d1) that causes Equation (2) to yield an integer. Because user, k, and crc are commonly an integer number of bytes, the number of dummy bits (d1) inserted is a multiple of eight and will always be an integer number of bytes.

According to this approach, the size of the dummy bits (d1) is small enough to represent only a small amount of overhead. Consequently, a data transmission system is able to maintain a high coding gain. For example, in a representative data transmission system, such as the data transmission system 300 such as illustrated in FIG. 3, the number of dummy bytes (D1) inserted into a superframe is never more than 0.42% (0.0042) of the total number of user data bytes transmitted. For data rates over 8 Mbps, the codeword length (N) can be chosen greater than 200 meaning that a high coding gain is maintained. For example, with 16 transmit symbols, the number of dummy bits (d2) added is always less than 16 which is also a negligible amount of overhead.

For a fixed codeword length, assuming that both User and Crc are in bytes and therefore divisible by eight, the number of dummy bytes (D1) when there are an integer number of codewords in a superframe (Equation (2)) can be as large as K−1. In this case, the worst case is when User+Crc=(M× K)+1 where M is an integer. However, if instead processing is restricted only by Equation (1), then the number of dummy words (D1) can be considerably less since N and K often have common divisors. For example, if N=240 and K=224 (R=16) then N/K=240/224=15/14 and the maximum number of dummy bytes (D1) that we would have to include would be thirteen (13). Note that if the greatest common divisor (gcd) of N and K is given by gcd(N, K), the reduced fraction N/K is equal to (N/gcd(N,K)/(K/gcd(N,K)) and the number of dummy bytes will never exceed K/gcd(N,K)−1 which was thirteen (13) in the above example.

Additional details on the operations associated with the rate adjustment processing 400 according to one embodiment of the invention are described as follows. The determining of the SNR measurements used in block 402 can follow the approach described in Cioffi, "A Multicarrier Primer," ANSI contribution T1E1.4/91-157, November 1991, which is hereby incorporated by reference. Generally, the SNR can be calculated for each DMT subcarrier (possibly for each symbol in a superframe in a cyclostationary environment). As an example, assume a 2.5 dB coding gain for the FEC code and a $10^{-7}$ bit error rate, the geometric SNR (SNRg) is computed (see Cioffi, "A Multicarrier Primer"). The number of user bits (b) that can be supported in a DMT symbol by the following equation $$b=L\ \log_2(1+SNRg/\Gamma)$$

where L is the number of DMT subcarriers and $\Gamma$ is the SNR gap defined as 9.8−2.5=7.3 dB for the assumed error rate and coding gain. The number of user bits per superframe is the sum of b over all DMT symbols of the superframe. When every DMT symbol carries the same number of bits, the number of user bits per superframe is just b multiplied by the number of active DMT symbols.

The identifying of the desired user rate in block 404 can operate to determine a maximum user data rate. The user data rate in bits/second is b multiplied by the superframe rate, with rounding to the nearest management configurable data rate. As an example, if management has specified any multiple of 64 kbps, then the result can be rounded down to the nearest multiple of 64 kbps. When there is not a choice below this maximum rate, then the lowest possible value is chosen or management is informed that this data rate cannot be supported. The chosen user data rate is represented by User and is specified in bytes per superframe. The assumption is that the dummy bits (d1) and CRC bytes are a very small fraction of the user data rate.

The determining of the codeword size (N) and the number of dummy bits (d1) before FEC encoding in block 406 can be performed as described below with reference to FIG. 5. For simplicity, it is assumed that the number of dummy bits (d1) inserted before FEC encoding will always be a multiple of eight (8) or in terms of bytes (i.e., D1). The user data rate and CRC will also be in multiples of bytes per superframe.

Figure 5:
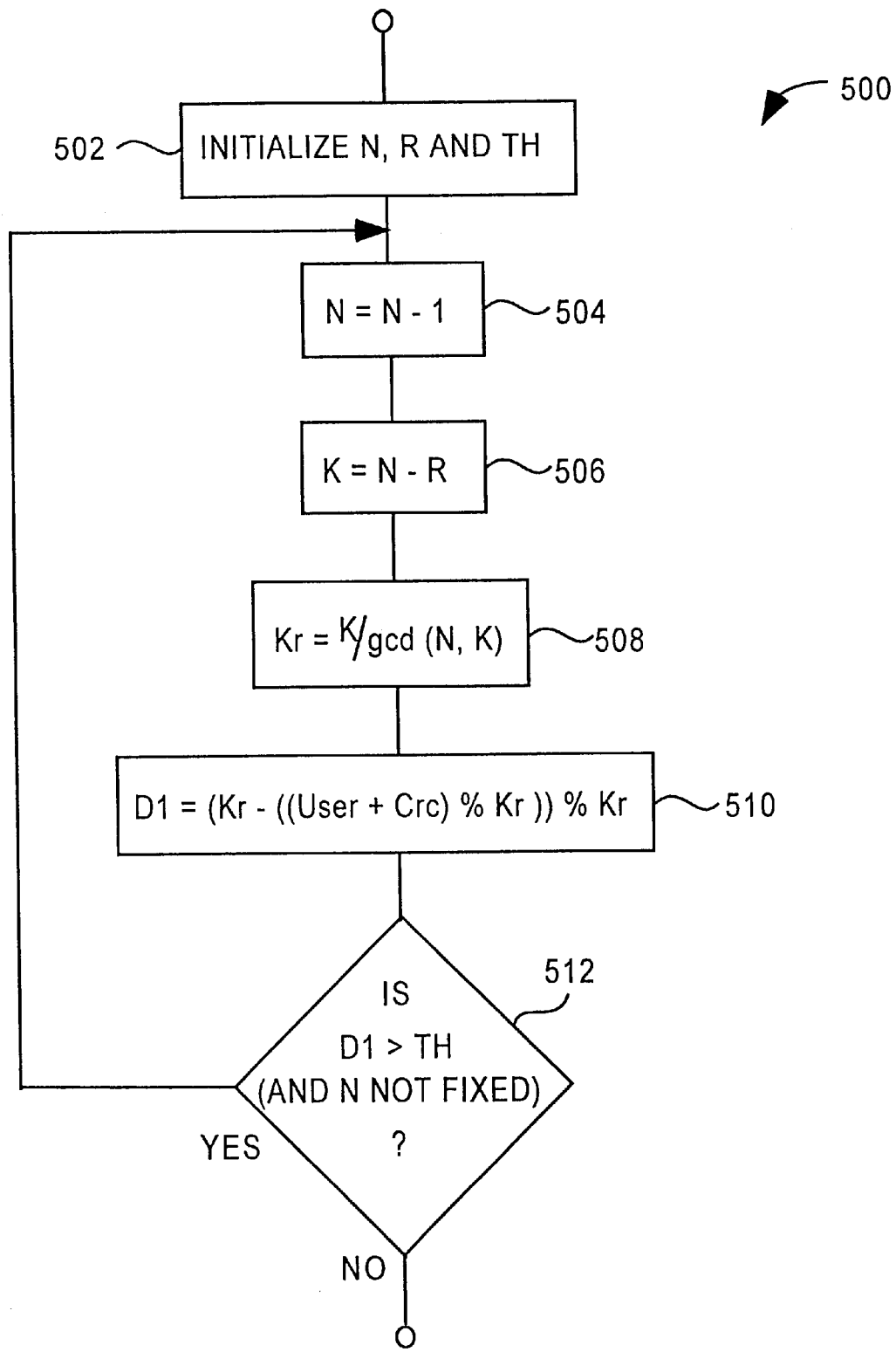
FIG. 5 is a flow diagram of processing associated with the determining of the codeword size (N) and the number of dummy bytes (D1) according to one embodiment of the invention.
Figure 6:
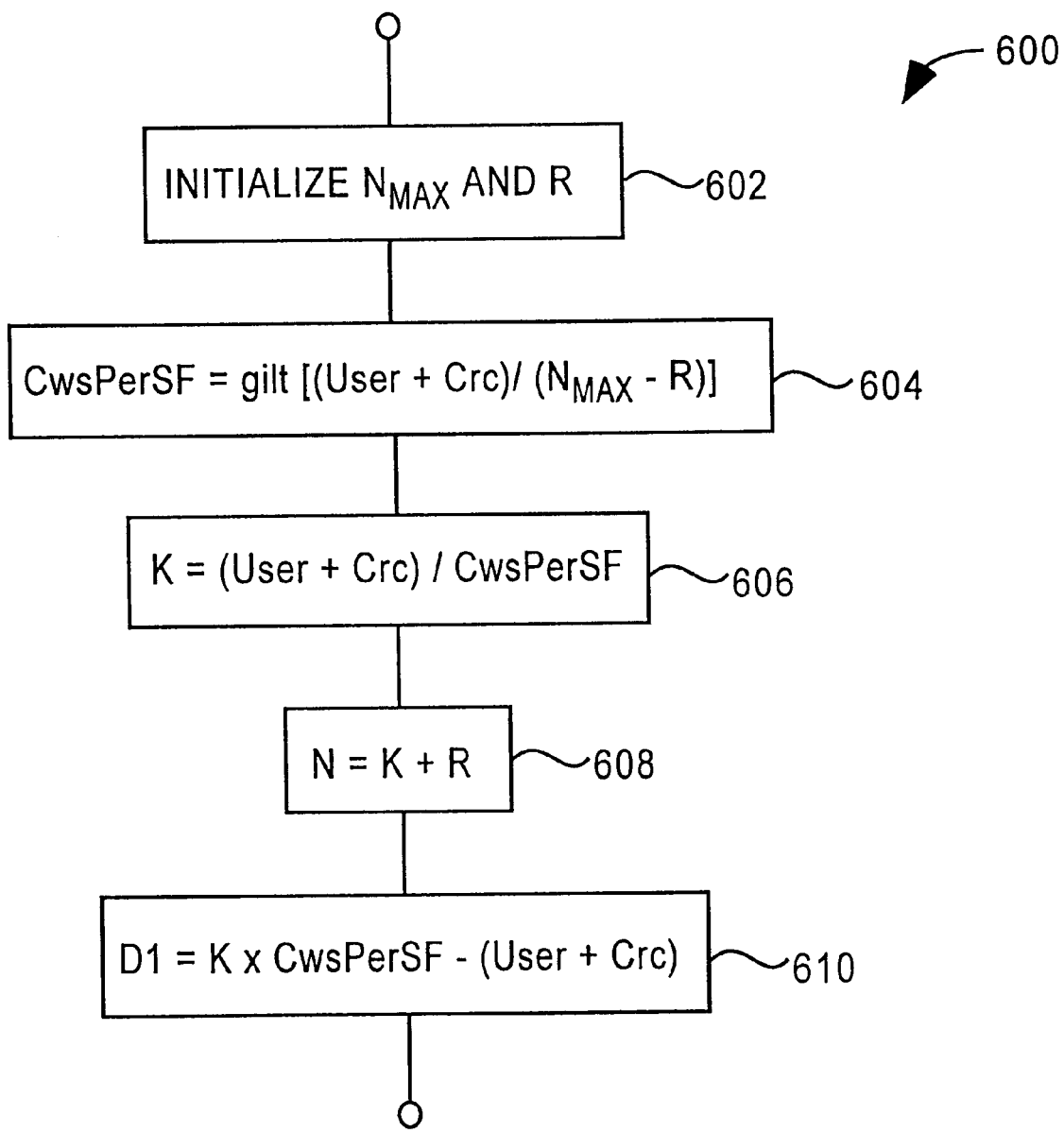
FIG. 6 is a flow diagram of processing associated with the determining of the codeword size (N) and the number of dummy bytes (D1) according to another embodiment of the invention.

FIGS. 5 and 6 are flow diagrams illustrating determination of the codeword size (N) and the number of dummy bytes (D1) according to embodiments of the invention. The flow diagram in FIG. 5 considers the case where codewords can cross superframe boundaries. This case is desirable when, for example, the additional delay is not important and the intent is to absolutely minimize the number of dummy bytes (D1). This case is also desirable when the intent is to use the same codeword size for all data rates. Further, this case is desirable for very low data rates when high coding gain can be maintained only by allowing codewords to span multiple superframes. The flow diagram in FIG. 6 considers the case where codewords are confined within superframe boundaries. In this case, there are always an integer number of codewords in each superframe.

FIG. 5 is a flow diagram of processing 500 associated with the determining of the codeword size (N) and the number of dummy bytes (D1) when codewords can span superframe boundaries according to one embodiment of the invention. The processing 500 is, for example, performed in block 406 of the rate adjustment processing 400.

The processing 500 begins with an initialization block 502 where the codeword size (N) is initialized to either a maximum size (Max) or to a fixed size, and the redundancy size (R) is initialized to a value typically between 2 and 32. The threshold (TH) is also initialized in the initialization block 502. The threshold (TH) can be set in accordance with the following equation.

$$TH=(User+Crc)/(N_{MAX}-R)$$

The number of dummy bytes (D1) should never exceed the threshold (TH).

Next, loop processing begins with block 504 where the codeword size (N) is reduced by one (1). Then, in block 506, the dataword size (K) is determined as N−R. Thereafter, the dataword size (K) is reduced by a division operation. The reduced dataword size (Kr) is determined as K/gcd(N,K) where the greatest common divisor (gcd) of N and K is given by gcd(N,K). Next, the dummy bytes (D1) is determined in block 510 in accordance with the following Equation (3).

$$D1=(Kr-((User+Crc)\ \%\ Kr))\ \%\ Kr \qquad (3)$$

where "%" represents the integer remainder after division.

After determining the dummy bytes (D1), a decision block 512 of the processing 500 determines, in the case where N is not fixed, whether the dummy bytes (D1) determined in block 510 is larger than the size of the threshold (TH). If so, then the processing 500 repeats blocks 504–510 to decrease the codeword size (N) by one (1) and to redetermine the number of dummy bytes (D1). Once the decision block 512 determines that the determined number of dummy bytes (D1) is less than or equal to the threshold (TH) (or when the incrementally reduced codeword size (N) reaches a minimum level), the processing 500 is completed as the codeword size (N) and the dummy bytes (D1) have thus determined. The minimum level is set to ensure sufficient coding gain while allowing the codeword size (N) to be reduced in attempting to improve (i.e. reduce) the number of dummy bytes (D1).

As an example, the processing 500 illustrated in FIG. 5 can be implemented by the following algorithm expressed in the following computer code (C language). The algorithm initializes parameters based on an exemplary system but a wide variety of other initial parameters can be used. Also, generally the algorithm forces codewords to be within one superframe, but optionally permits the codewords to span two superframes in the case of low data rates. The computer code that implements the algorithm for the purpose of determining both the codeword size (N) and the number of dummy bytes (D1) is as follows:

```
/* Exemplary initialization parameters */
/* initialize: N=256 bytes, Nmax=255 */
/* B=(User+Crc, */
/* R=codeword redundancy (e.g., 16) */

/* while loop searches for the largest value */
/* of N with small overhead */
/* we should never need as many or more than */
/* 1 dummy byte codeword or part of a */
/* codeword in a superframe */ while d1>8* ⌊B/Nmax-R⌋ /* where ⌊ ⌋ */
/* means "greatest integer less than" */
      N=N-1;
      K=N-R; /* R is the management */
/* configurable redundancy */
      Kr=K/gcd(N,K);
      D1=8*((Kr-(B % Kr)) %Kr);
/* "%" means integer remainder after */
/* division, d1 is measured in bits */
   end while;
```

The algorithm provided above operates on the basis that the greater the codeword size, the higher the coding gain. It also recognizes that, at very low data rates, one codeword might include more than one superframe. If delay is an issue, however, it might be more important to minimize the delay than to maximize the coding gain.

The number of dummy bytes (D1) inserted in a superframe before FEC encoding should never need to equal or exceed the number of complete codewords in a superframe. For example, if there are between 10 and 11 codewords in a superframe, there should never be more than 9 dummy bytes (D1). If there were 11 dummy bytes (D1) and 10 codewords, for example, one could instead decrease the codeword size by one byte (1) and use only one (1) dummy byte (D1).

FIG. 6 is a flow diagram of processing 600 associated with the determining of the codeword size (N) and the number of dummy bytes (D1) when codewords are constrained within superframe boundaries according to another embodiment of the invention. The processing 600 is also, for example, performed in block 406 of the rate adjustment processing 400.

The processing 600 begins with an initialization block 602 where the codeword size (N) is initialized to a maximum size (Nmax) and the redundancy size is chosen (R). The number of codewords in each superframe (CwsPerSF) is determined in the next block 604 from the following Equation (4).

$$CwsPerSF=ceil[(User+Crc)/(Nmax-R)] \quad (4)$$

where "ceil" represents the smallest integer greater than. The dataword size (K) is then determined in the next block 606 by the Equation (5).

$$K=ceil[(User+Crc)/CwsPerSF] \quad (5)$$

Next, the codeword size (N) is extracted from the dataword size (K) in block 608, by adding the dataword size (K) and the redundancy size (R). The number of dummy bytes (D1) is then determined 610 as the difference between the total number of datawords and the total number of bytes to be encoded (User+Crc). Specifically, the number of dummy bytes (D1) is determined in accordance with Equation (6) as follows.

$$D1=K \times CwsPerSF-(User+Crc) \quad (6)$$

As an example, the processing 600 illustrated in FIG. 6 can be implemented by the following algorithm expressed in the following computer code (C language). The computer code that implements the algorithm for the purpose of determining both the codeword size (N) and the number of dummy bytes (D1) is as follows:

Nmax=255
   CwsPerSF=(int)ceil((User+Crc)/(Nmax−R));
   K=(int)ceil ((User+Crc)/CwsPerSF);
   D1=K*CwsPerSF−(User+Crc);
where "ceil" means smallest integer greater than or ceiling it is a standard function used in C programming.

The determining of the number of dummy bits (d2) after FEC encoding in block 408 can be performed as follows. In general, any number of dummy bits (d2) can be added after FEC encoding, but for performance reasons it is advantageous to keep the number small. If the number of bits in each DMT symbol is the same, then the number of dummy bits (d2) can be determined for the following operation:

$$d2=(S-[((User+Crc+D1) \times (N/K)) \% S]) \% S$$

where S is the number of active DMT symbols and "%" means integer remainder after division.

After having determined the dummy bytes (D1), the dummy bits (d2) and the codeword size (N), the bit loadings for the symbols of the superframe are determined. The total number of bits in each superframe can be determined as follows.

$$\text{total bits/superframe}=[(user+crc+d1) \times (N/K)]+d2$$

If all symbols transmitting data within the superframe carry the same number of bits, the number of bits in each symbol is the total bits/superframe divided by the number of symbols transmitting data. Of course, if the system allows the symbols to carry different numbers of bits (e.g., such as with multiple bit allocation tables), the total bits/superframe should be divided as per the requirements of the system (noting that the dummy bits d2 would not be needed). Thereafter, the bits allocated to the symbols can be loaded onto DMT subcarriers of the symbols using an algorithm such as that described in Chow, "Bandwidth Optimized Digital Transmission Techniques for Spectrally Shaped Channels with Impulse Noise," Ph.D. dissertation, Stanford University, 1993.

Additional optional processing for rate processing provides for adjustments to the number of user bits when a determined true margin is below requirements. As an example, with the actual codeword length and the actual number of bits loaded, the true coding gain and margin can be computed as described, for example, in Cioffi, "A Multicarrier Primer." The coding gain can also be determined experimentally or by simulation.

When the true margin differs from a target margin by greater that some specified amount, then the number of user bits (user) can be altered as follows. A good rule of thumb is that each additional bit on any subcarrier requires an additional 3 dB of SNR. Similarly, 0.5 bits requires about 1.5 dB of additional SNR, as the relationship between the number of bits and the SNR in dB is approximately linear. We denote the desired margin, measured in dB, as yd and the calculated margin as yc. The new number of user bits can be approximated by $$\text{user}=\text{user previous}+S\cdot T\cdot((yc-yd)/3)$$

where user previous is the previous user data rate in bits per superframe, S is the number of active symbols and T is the number of subcarriers that carry bits in each DMT symbol. Then the processing associated with blocks 404–410 is repeated. For example, a 0.1 dB error in margin assuming nine active DMT symbols in a 2 kHz, 20 symbol superframe and 230 active subcarriers translates to about 138 kbps change in user data rate. For typical VDSL rates on the order of 6 Mbps or higher, a 0.1 dB error is not significant.

The invention enables the user data rate to be set at, for example, any multiple of 64 kbps. This granularity is chosen because most telephone network systems are derived from an 8 kHz clock and most systems also transmit data in bytes. Other granularities are also available. The codeword size is chosen to jointly minimize the overhead and maximize the coding gain.

The advantages of the invention are numerous. One advantage of the invention is that error correction (e.g., FEC) codewords are decoupled from frames (or symbols) as well as superframes. The result is that user data rate is made more independent from system performance and thus can be readily set in accordance with industry standards. Another advantage of the invention is that only minimal overhead is needed and that high coding gains can be maintained.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A method for transmitting a data quantity in a superfame of a multicarrier modulation system, said method comprising the operations of:

(a) identifying a user rate for data transmissions;

(b) identifying a superframe rate;

(c) determining a data quantity to be transmitted in a given superframe based on the user rate and the superframe rate;

(d) determining a code rate for providing redundancy with the data quantity; and (e) determining a first adjustment dummy data quantity such that when added to the data quantity and then multiplied by the code rate yields an integer number.

2. A method as recited in claim 1, wherein the first adjustment dummy data quantity (D1) is determined in accordance with the following equation (1):

$$(U+D1)\times Q \rightarrow \text{Integer}$$

where U represents the data quantity and Q is the code rate.

3. A method as recited in claim 2, wherein said determining of the first adjustment dummy data quantity (D1) using the equation (1) operates to also permit altering of the code rate (Q) so that a potentially smaller quantity for the first adjustment dummy data quantity (D1) can be determined.

4. A method as recited in claim 2, wherein the first adjustment dummy data quantity (D1) is much less than the data quantity (U) to be transmitted in a given superframe.

5. A method as recited in claim 2, wherein said determining of the first adjustment dummy data quantity (D1) using the equation (1) operates to also permit altering of a codeword size within a predetermined range.

6. A method as recited in claim 1, wherein the integer number represents an integer number of codewords to be transmitted in the superframe.

7. A method as recited in claim 1, wherein the data quantity that is determined by said determining step (c) further includes data associated with providing a cyclic redundancy check.

8. A method as recited in claim 1, wherein the multicarrier modulation system is an xDSL system using Synchronized Discrete Multi Tone (SDMT).

9. A method as recited in claim 1, wherein the redundancy associated with the code rate is a Forward Error Correction (FEC).

10. A method for transmitting a data quantity in a superfame of a multicarrier modulation system, the superframe including transmit frames and receive frames, said method comprising the operations of:

(a) identifying a user rate for data transmissions;

(b) identifying a superframe rate;

(c) determining a data quantity to be transmitted in the superframe based on the user rate and the superframe rate;

(d) determining a code rate for providing redundancy with the data quantity;

(e) determining a first adjustment dummy data quantity such that when added to the data quantity and then multiplied by the code rate yields an integer number representing an enlarged data quantity to be transmitted in the superframe; and (f) determining a second adjustment dummy data quantity such that when added to the enlarged data quantity to produce a final data quantity, the final data quantity is evenly divisible by the number of transmit frames in the superframe.

11. A method as recited in claim 10, wherein the first adjustment dummy data quantity (D1) is determined in accordance with the following equation (1) that is made to yield an integer:

$$(U+D1)\times Q \rightarrow \text{Integer} = EQ$$

where U represents the data quantity, Q is the code rate, and EQ is the enlarged data quantity that made to be an integer.

12. A method as recited in claim 11, wherein said determining (e) of the first adjustment dummy data quantity (D1) using the equation (1) operates to also permit altering of the code rate (Q).

13. A method as recited in claim 11, wherein the second adjustment dummy data quantity (D2) is determined in accordance with the following equation (2) that is made to yield an integer:

$$(EQ+D2)/TF \rightarrow \text{Integer}$$

where TF is the number of transmit frames in the superframe.

14. A method as recited in claim 13, wherein the first adjustment dummy data quantity (D1) and the second adjustment dummy data quantity (D2) are much less than the data quantity (U) to be transmitted in the superframe.

15. A method as recited in claim 11, wherein said determining (e) of the first adjustment dummy data quantity (D1) using the equation (1) operates to also permit altering of a codeword size (N) within a predetermined range.

16. A method as recited in claim 10, wherein the integer number represents an integer number of codewords to be transmitted in the superframe.

17. A method as recited in claim 10, wherein the data quantity that is determined by said determining step (c) further includes data associated with providing non-user data information.

18. A method as recited in claim 17,
wherein the multicarrier modulation system is a Synchronized Discrete Multi Tone (SDMT) system, and
wherein the non-user data information is cyclic redundancy check data.

19. A method as recited in claim 10, wherein the redundancy associated with the code rate is a Forward Error Correction (FEC).

20. A computer readable medium containing program instructions for transmitting a data quantity in a superfame of a multicarrier modulation system, the superframe including transmit frames and receive frames, said computer readable medium comprising:
first computer readable code devices for identifying a user rate for data transmissions;
second computer readable code devices for identifying a superframe rate;
third computer readable code devices for determining a data quantity to be transmitted in the superframe based on the user rate and the superframe rate;
fourth computer readable code devices for determining a code rate for providing redundancy with the data quantity; and
fifth computer readable code devices for determining a first adjustment dummy data quantity such that when added to the data quantity and then multiplied by the code rate yields an integer number representing an enlarged data quantity to be transmitted in the superframe.

21. A computer readable medium as recited in claim 20, wherein the first adjustment dummy data quantity (D1) is determined by said fifth computer readable code devices in accordance with the following equation (1) that is made to yield an integer:

$$(U+D1) \times Q \rightarrow \text{Integer} = EQ$$

where U represents the data quantity, Q is the code rate, and EQ is the enlarged data quantity that made to be an integer.

22. A computer readable medium as recited in claim 20, wherein said computer readable medium further comprises:
sixth computer readable code devices for determining a second adjustment dummy data quantity such that when added to the enlarged data quantity to produce a final data quantity, the final data quantity is evenly divisible by the number of transmit frames in the superframe.

23. A computer readable medium as recited in claim 22, wherein the first adjustment dummy data quantity (D1) is determined by said fifth computer readable code devices in accordance with the following equation (1) that is made to yield an integer:

$$(U+D1) \times Q \rightarrow \text{Integer} = EQ$$

where U represents the data quantity, Q is the code rate, and EQ is the enlarged data quantity that made to be an integer.

24. A computer readable medium as recited in claim 23, wherein said determining of the first adjustment dummy data quantity (D1) using the equation (1) operates to also permit altering of a codeword size.

25. A computer readable medium as recited in claim 23, wherein the second adjustment dummy data quantity (D2) is determined in accordance with the following equation (2) that is made to yield an integer:

$$(EQ+D2)/TF \rightarrow \text{Integer}$$

where TF is the number of transmit frames in the superframe.

26. A transmitter for a data transmission system using multicarrier modulation, said transmitter comprising:
a buffer that receives and stores a data quantity to be transmitted;
a first insertion unit, said first insertion unit determines a first quantity of dummy data and inserts the first quantity of dummy data into the data quantity supplied from said buffer to produce an enlarged data quantity;
an error correction unit, said error correction unit receives the enlarged data quantity and performs redundancy coding to produce a redundancy data quantity;
a data symbol encoder, said data symbol encoder receives the redundancy data quantity to be transmitted and encodes bits associated with the redundancy data quantity to frequency tones of a frame;
a multicarrier modulation unit, said multicarrier modulation unit modulates the encoded bits on the frequency tones of a frame to produce modulated signals; and
a digital-to-analog converter, said digital-to-analog converter converts the modulated signals to analog signals.

27. A transmitter as recited in claim 26, wherein the superframe includes a plurality of frames, with one or more of the frames being capable of carrying data in a first direction and one or more of the frames being capable of carrying data in a second direction.

28. A transmitter as recited in claim 27, wherein said data symbol encoder encodes the bits of the digital data to those of the frames of the superframe that are assigned to carrying data in the first direction and not to those of the frames of the superframe that are assigned to carrying data in the second direction.

29. A transmitter as recited in claim 26, wherein said modulation unit modulates the encoded bits on the frequency tones of a symbol using Discrete Multi Tone (DMT) modulation.

30. A transmitter as recited in claim 29, wherein the data transmission system is an xDSL system using time division duplexing.

31. A transmitter as recited in claim 29, wherein said error correction unit is a forward error correction unit.

32. A transmitter as recited in claim 26,
wherein said transmitter further comprises:
a second insertion unit, said second insertion unit determines a second quantity of dummy data and inserts the second quantity of dummy data into the redundancy data quantity supplied from said error correction unit to produce a modified redundancy data quantity, and
wherein the said data symbol encoder receives the modified redundancy data quantity to be transmitted and encodes bits associated with the modified redundancy data quantity to frequency tones of a frame.

33. A transmitter as recited in claim 32, wherein said transmitter further comprises:

a cyclic redundancy check unit operatively connected between said buffer and said error correction unit.

34. A transmitter as recited in claim 26, wherein said error correction unit has a code rate associated with the redundancy coding, and wherein said first insertion unit determines the first quantity of dummy data such that when added to the data quantity and then multiplied by the code rate yields an integer number.

35. A transmitter as recited in claim 34, wherein the first quantity of dummy data (D1) is determined in accordance with the following equation (1):

$$(U+D1) \times Q \rightarrow \text{Integer}$$

where U represents the data quantity and Q is the code rate.

36. A transmitter as recited in claim 26, wherein said transmitter further comprises:

a non-user data insertion unit operatively connected between said buffer and said error correction unit to insert non-user data.

* * * * *

UNITED STATES PATENT AND TRADEMARK OFFICE
CERTIFICATE OF CORRECTION

PATENT NO.      : 6,480,475 B1
DATED           : November 12, 2002
INVENTOR(S)     : Cory S. Modlin et al.

It is certified that error appears in the above-identified patent and that said Letters Patent is hereby corrected as shown below:

<u>Title page, Item [54] and Column 1, lines 1-3,</u>
Should read:

-- METHOD AND SYSTEM FOR ACCOMMODATING A WIDE RANGE OF USER DATA RATES IN A MULTICARRIER DATA TRANSMISSION SYSTEM --

Signed and Sealed this

Fifteenth Day of April, 2003

JAMES E. ROGAN
*Director of the United States Patent and Trademark Office*